(12) United States Patent
Liu et al.

(10) Patent No.: US 11,496,280 B2
(45) Date of Patent: Nov. 8, 2022

(54) METHOD AND APPARATUS FOR DMRS TRANSMISSION

(71) Applicant: Lenovo (Beijing) Limited, Beijing (CN)

(72) Inventors: Hongmei Liu, Beijing (CN); Zhennian Sun, Beijing (CN); Chenxi Zhu, Beijing (CN); Hongchao Li, Beijing (CN); Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 170 days.

(21) Appl. No.: 16/638,444

(22) PCT Filed: Aug. 11, 2017

(86) PCT No.: PCT/CN2017/097186
§ 371 (c)(1),
(2) Date: Feb. 11, 2020

(87) PCT Pub. No.: WO2019/028869
PCT Pub. Date: Feb. 14, 2019

(65) Prior Publication Data
US 2020/0177358 A1 Jun. 4, 2020

(51) Int. Cl.
*H04L 5/10* (2006.01)
*H04W 76/27* (2018.01)
(Continued)

(52) U.S. Cl.
CPC .............. *H04L 5/10* (2013.01); *H04L 5/0007* (2013.01); *H04L 5/0051* (2013.01);
(Continued)

(58) Field of Classification Search
CPC ....... H04L 5/0051; H04L 5/0007; H04L 5/10; H04L 5/0064; H04L 27/2607; H04W 72/042; H04W 76/27
(Continued)

(56) References Cited

U.S. PATENT DOCUMENTS

| 2011/0194536 A1 | 8/2011 | Kim | |
| 2015/0318973 A1* | 11/2015 | Wang | .................... H04L 5/0023 |
| | | | 370/329 |

(Continued)

FOREIGN PATENT DOCUMENTS

| CN | 102082595 A | 6/2011 |
| WO | 2014113971 A1 | 7/2014 |

OTHER PUBLICATIONS

Huawei, DCI discussion on transparent MU-MIMO, 3GPP TSG RAN WG1#61 R1-103103, May 10-14, 2010, p. 1-4.
(Continued)

*Primary Examiner* — Rownak Islam
(74) *Attorney, Agent, or Firm* — Kunzler Bean & Adamson (57) ABSTRACT

The present disclosure is related to a method and apparatus for DMRS transmission. According an embodiment of the disclosure, a method including determining at least one antenna port for a user equipment (UE); determining a demodulation reference signal (DMRS) resource for each of the at least one antenna port respectively; determining the number of symbols for carrying the determined DMRS resource in time domain; and indicating the determined DMRS resource of each of the at least one antenna port to the UE. Embodiments of the disclosure solve the technical problem of indicating DMRS resource and determining symbol/subcarriers for carrying the DMRS resource during DMRS transmission.

22 Claims, 5 Drawing Sheets

(51) Int. Cl.
*H04L 5/00* (2006.01)
*H04L 27/26* (2006.01)
*H04W 72/04* (2009.01)

(52) U.S. Cl.
CPC ........ *H04L 5/0064* (2013.01); *H04L 27/2607* (2013.01); *H04W 72/042* (2013.01); *H04W 76/27* (2018.02)

(58) Field of Classification Search
USPC .......................................................... 370/329
See application file for complete search history.

(56) References Cited

U.S. PATENT DOCUMENTS

| | | | |
|---|---|---|---|
| 2018/0041316 A1* | 2/2018 | Ko | H04L 5/0048 |
| 2019/0312703 A1* | 10/2019 | Xie | H04W 88/00 |
| 2019/0349023 A1* | 11/2019 | Ge | H04B 1/7143 |
| 2020/0119881 A1* | 4/2020 | Xia | H04L 5/0051 |
| 2020/0127786 A1* | 4/2020 | Kwak | H04L 27/26025 |
| 2020/0169376 A1* | 5/2020 | Gao | H04W 24/08 |
| 2020/0252191 A1* | 8/2020 | Tang | H04W 72/0413 |
| 2020/0296747 A1* | 9/2020 | Kim | H04W 72/1289 |
| 2021/0185706 A1* | 6/2021 | Park | H04L 5/00 |

OTHER PUBLICATIONS

PCT/CN2017/097186, International Search Report, Patent Cooperation Treaty, Apr. 28, 2018, p. 1-3.
PCT—CN2017/097186, Written Opinion of the International Searching Authority, Patent Cooperation Treaty, dated Apr. 28, 2018, p. 1-4.

* cited by examiner

METHOD AND APPARATUS FOR DMRS TRANSMISSION

TECHNICAL FIELD

The present disclosure is directed to wireless communication technology, and more particularly relates to DMRS (demodulation reference signal) transmission technology in wireless communication.

BACKGROUND

In a wireless communication network, a base station and UE (user equipment) generally demodulate data based on DMRS resources. There are multiple configurations for the DMRS resources in view of different waveforms and the DMRS port number to be supported. For example, 3GPP (3rd Generation Partnership Project) specifies that for CP-OFDM (cyclic prefix-orthogonal frequency division multiplexing), an UE is configured by higher layers with DMRS resources generated either from DMRS Configuration type 1 or from DMRS Configuration type 2 for DL/UL (downlink/uplink), wherein for each configuration type, the DMRS resources are further presented in different patterns and may be carried in one orthogonal frequency division multiplexing symbols in time domain and one or two subcarriers in frequency domain. Similarly, 3GPP also specifies different configurations for DMRS resources in DFT-S-OFDM (discrete Fourier transform-spread- orthogonal frequency division multiplexing) waveform. At the same time, according to Long Term Evolution (LTE)/LTE-Advanced (LTE-A), for DL DMRS transmission, the port mapping order is predefined in specification, and port group indication is used to determine the DMRS resources; and for UL DMRS transmission, the port mapping order is indicated in UE-specific DCI (Downlink Control Information), and the transmission layer is also indicated to determine the DMRS resources. However, the 3GPP does not discuss how to generate the DMRS resources and mapping the DMRS port to a specific DMRS resource considering the various configurations and waveforms for DL/UL. That is, no agreements on how to design the DIVERS resources and how to determine the symbol number used by a DMRS source etc. are achieved in the LTE/LTE-A.

Thus, there is a need for further complementing and improving the technical solutions on the DMRS transmission.

SUMMARY OF THE DISCLOSURE

One object of the disclosure is to provide a method and apparatus for indicating DMRS resources to UEs.

Another object of the disclosure is to provide a method and apparatus for determining the number of symbols for carrying a DMRS resource in time domain.

A yet another object of the disclosure is to provide a method and apparatus for determining the number of subcarriers for carrying a DMRS resource in frequency domain.

According to one embodiment of the disclosure, a method includes: determining a demodulation reference signal (DMRS) resource for each of the at least one antenna port for a user equipment (UE) respectively; and indicating the DMRS resource of each of the at least one antenna port to the UE.

In another embodiment of the disclosure, the DMRS resource is selected from a DMRS mapping table, and the DMRS mapping table is generated by a plurality of domain resources combined in at least one priority order. The at least one priority order is predefined. When the at least one priority order is more than one, the method further comprises indicating the priority order for generating the DMRS resource. For a CP-OFDM waveform, each of the at least one priority order also indicates the sequence in which the transmission layers supported by a single UE uses the DMRS resources. For a CP-OFDM waveform, the DMRS mapping table includes an 8-layer sub-table for a single UE with 8-layer generated in one of the at least one priority order. The DMRS mapping table further includes an additional sub-table generated in the same priority order for a single UE with layer less than 8, and the additional sub-table is generated by dividing at least one row from the 8-layer sub-table into multiple rows. For a CP-OFDM waveform, the priority order is indicated to the UE via a radio resource control (RRC) signaling or included in downlink control information (DCI). The DMRS resource is indicated to the UE via downlink control information (DCI). For a CP-OFDM waveform, the DMRS mapping table includes an 8-layer sub-table for a single UE with 8-layer generated in each of the at least one priority order, wherein each row of the 8-layer sub-table corresponds to one priority order. The DMRS table further includes an additional sub-table for a single UE with layer less than 8 generated by dividing at least one row from the 8-layer sub-table into a plurality of rows. For a CP-OFDM waveform, when an additional DMRS is configured, the DMRS mapping table is generated by 2 domain resources combined in the at least one priority order. When the DMRs resource is for downlink, the DMRS mapping table further includes information mapping a DMRS port to a DMRS resource in mapping order of the plurality of domain resources. The DMRS port is indicated via downlink control information (DCI).

According to an embodiment of the disclosure, the method further includes determining the number of symbols for carrying the DMRS resource in time domain. When the domain resources for indicating the MARS resource includes a group of orthogonal covering codes (OCCs), the method further include determining whether all elements of the group of OCCs are identical, and when all of the elements are identical, the number of symbols is 1 and when all of the elements are not identical, the number of symbols is more than one. When an additional DMRS is configured, the number of symbols is 1. When an additional DMRS is configured, the method further comprises repeating one of the symbols carrying corresponding front-loaded DMRS resource. The number of symbols for carrying the DMRS resource is predefined to be 1 or more than one. The method further includes indicating the number of symbols for carrying the determined DMRS resource to the UE via RRC signaling or downlink control information (DCI).

According to an embodiment of the disclosure, the method further includes determining the number of subcarriers for carrying the determined DMRS resource in frequency domain. When the domain resources for indicating the DMRS resource includes at least one group of orthogonal covering codes (OCCs), the method further include determining whether all elements of the group of OCCs are identical, and when all of the elements are identical, the number of subcarriers is 1 and when all of the elements are not identical, the number of subcarriers is more than one.

An embodiment of the disclosure provides a method, which includes: receiving information indicating the DMRS resource of the antenna port; and receiving DMRS for each of the antenna port based on the indicated information.

An embodiment of the disclosure provides a method, which includes: receiving information indicating the DMRS resource of the antenna port; and receiving DMRS for each of the antenna port based on the indicated information.

Embodiment of the disclosure so provides apparatuses for performing the methods.

Embodiments of the disclosure solve the technical problems concerning on DMRS transmission, such as how to indicate a DMRS resource to UEs and how to determine the number of symbols/subcarriers for carrying a DMRS resource, which will greatly facilitate the evolution of LTE/LTE-A.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

Figure 1:
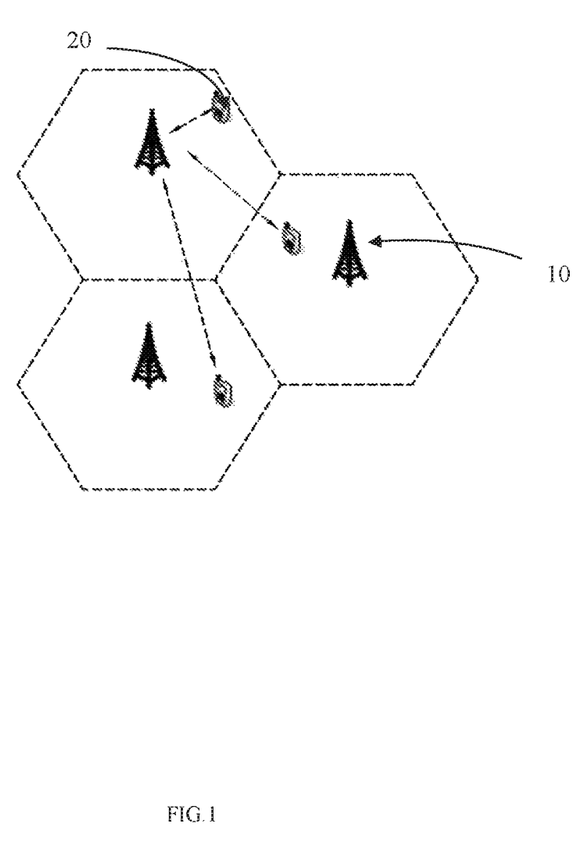
FIG. 1 illustrates a wireless communication system 100 according to an embodiment of the disclosure.

FIG. 1 illustrates a wireless communication system 100 according to an embodiment of the disclosure. As shown in FIG. 1, the wireless communication system 100 includes a plurality of base stations 10, such as a plurality of eNBs, or plurality of gNBs and a plurality of UEs 20. Each base station 10 can be provided with a plurality of antennas (not shown), and configure each antenna to be at least one antenna port to transmit data/signaling to UEs 20 and receive data/signaling, from UEs 20 via the corresponding antenna port. For DL, when a base station 10 transmit data via an antenna port to a UE 20, the base station 10 will indicate the DMRS resource about the antenna port to the UE 20 so that the UE 20 can demodulate the received data based on the DMRS resource. On the hand, the UE 20 will also receive an indication of a DMRS resource and information indicating transmission layers for UL, so that the UE 20 can transmit data in the manner as scheduled by the base station 10.

The 3GPP specifies two waveforms, i.e., CP-OFDM and DFT-S-OFDM. Recently released RAN1 #89 updated two types of DMRS configurations for DL/UL, wherein according to configuration 1, when the DMRS resource is transmitted in one symbol, 1 group of frequency domain resources, i.e., 2 combs and 1 group of code domain resources, i.e. 2 CSs (cyclic shift) can be used to generate DMRS resources. While, when the each DMRS resource is transmitted in two symbols, 2 comb, 2 CS, and 2 TD-OCC (time domain-orthogonal cover code) can be used to generate the DMRS resources. In the other hand, according to configuration 2, when the DMRS resource is transmitted in one symbol, 2 FD-OCC (frequency domain-orthogonal cover code) across adjacent REs (resource elements) and 3 frequency domain shift in the frequency domain can be used to generate the DMRS resources. While when the DMRS resource is transmitted in 2 symbols, 3 frequency domain shift, 2 FD-OCC across adjacent REs in the frequency domain, and 2 TD-OCC can be used to generate the DMRS resources.

At the same time, RAN1 #89 updated the MARS for DFT-S-OFDM to be: for DFT-S-OFDM based physical uplink shared channel (PUSCH) DMRS, the DMRS are mapped to REs using a comb structure, i.e., interleaved frequency division multiple access (IFDMA). Front load DMRS is allocated to 1 or 2 symbols. When 2 symbols are allocated for a DMRS resource, 2 TD-OCCs are also used for orthogonal DMRS port multiplexing.

However, 3GPP does not achieve any agreement on the DMRS indication and how to determine the symbol/subcarrier number of a DMRS resource. These impede the implementation of DMRS transmission technology.

Methods and apparatuses according to embodiments of the disclosure can solve the technical problems concerning on how to indicate a DMRS resource and determine the number for symbols/subcarriers for carrying a DMRS resource.

According to an embodiment of the disclosure, a method for DMRS transmission mainly includes: determining a DMRS resource for each of the at least one antenna port for a UE) respectively; and indicating the DMRS resource of each of the at least one antenna port to the UE.

Figure 2:
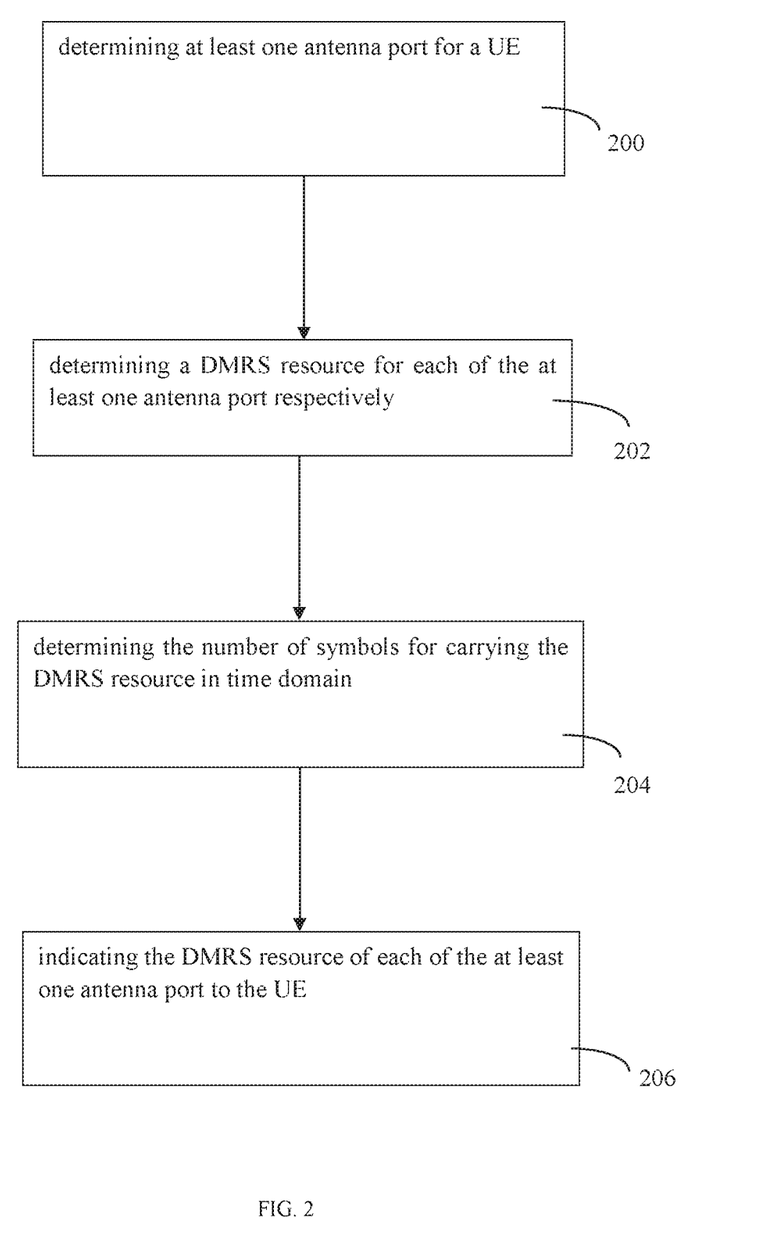
FIG. 2 illustrates the flow chart of a method for DMRS transmission according to an embodiment of the present disclosure.

Specifically, FIG. 2 illustrates the flow chart of a method for DMRS transmission according to an embodiment of the present disclosure.

When a communication is set up between a base station 10 and a UE 20, the base station 10 will indicate relative DMRS resources to the UE 20 to ensure smooth data transmission for DL/UL. At the same time, since a DMRS resource may be transmitted in one or more symbols, the number of symbols for carrying the DMRS resources will be determined, for example by the base station 10 before indicating to the UE 20 according to an embodiment of the disclosure. As shown in FIG. 2 according to an embodiment of the disclosure, in step 200, at least one antenna port for a UE 20 is determined, for example by a base station 10 to transmit/receive data and/or signaling. In step 202, a DMRS resource for each of the at least one antenna port is determined respectively, for example by the base station 10. In step 203, the number of symbols for carrying the determined DMRS resource in time domain will be determined, for example by the base station 10. Then, in step 204, the determined DMRS resource of each of the at least one antenna port is indicated to the UE 20, for example by the base station 10.

The determined DMRS resource may be selected from a DMRS mapping table, and the DMRS mapping table is generated by a plurality of domain resources combined in at least one priority order. More details about the DMRS mapping table and the generation of the DMRS mapping table will be illustrated in the following text. The plurality of domain resources may include a group of frequency domain resources, hereafter, marked as "comb" as indicated in one case of DMRS configuration 1. In another embodiment of the disclosure, the plurality of domain resources includes a group of code domain resources, CS and TD-OCC as indicated in the other case of DMRS configuration 1. For example, the group of frequency domain resources may be comb 0 or comb 1, code domain resource may be CS 0 or CS 6, TD-OCC (+1 +1), or TD-OCC(+1 −1). According to a further embodiment of the disclosure, the plurality of domain resources may include frequency shift and a group of FD-OCC as indicated in one case of DMRS configuration 2, and the plurality of domain resources may further include TD-OCC as indicated in other case of DMRS configuration 2.

Figure 3:
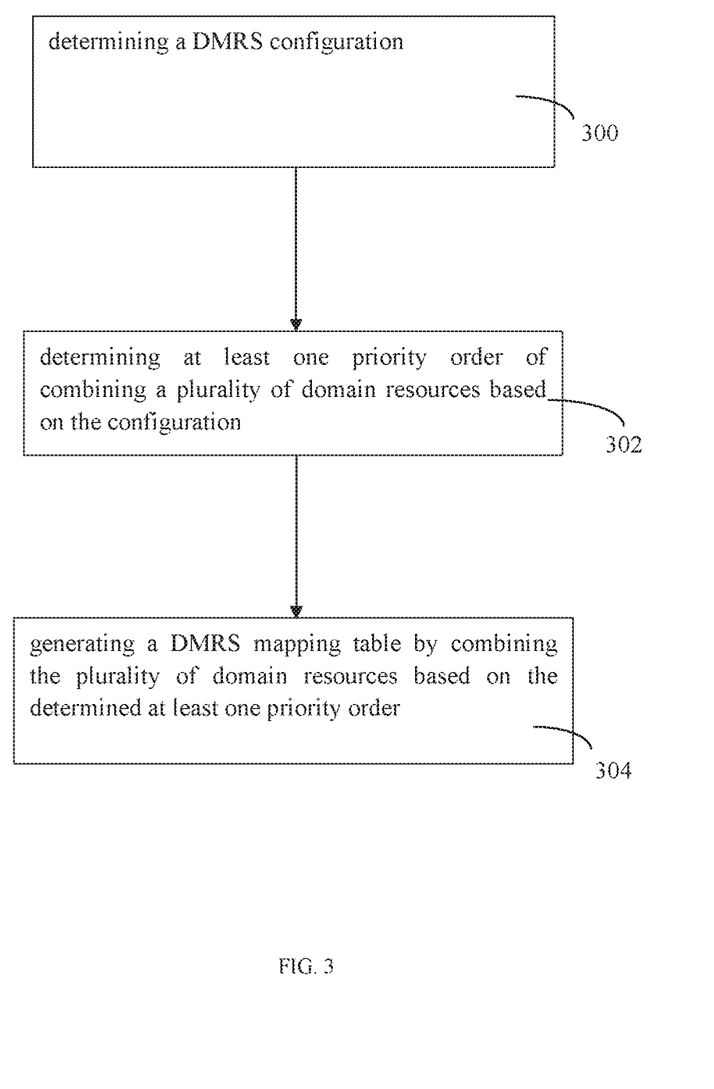
FIG. 3 illustrates the flow chart of a method for generating the indications of DMRS resources, which are arranged in a DMRS mapping table according to an embodiment of the present disclosure.

FIG. 3 illustrates the flow chart of a method for generating the indications of DMRS resources, which are arranged in a DMRS mapping table according to an embodiment of the present disclosure.

As shown in FIG. 3, in step 300, the configuration of DMRS resources is determined. For example, the configuration may be configuration 1 or configuration 2 provided in RAN1 #89.

In step 302, at least one priority order of combining a plurality of domain resources is determined based on the configuration. For example, when the configuration of DMRS is the first case of configuration, it means that 2 comb and 2 CS are used to generate the indication of DIN/IRS resources, which may be comb 0, comb 1, CS 0 and CS 6. The priority order of combing domain resources comb and CS may be firstly maintain one comb and alternating 2 CS, and then repeating the combination by maintaining the other comb, that is, the priority order of CS is higher than comb. Then, in step 304, a DMRS mapping table is generated by combining the plurality of domain resources based on the determined at least one priority order. More than one priority order may be determined. In this case, each DMRS mapping table based on one priority order corresponds to a sub-table, and multiple the sub-tables will be combined into one table.

Various embodiments according to the disclosure are provided as follows to illustrate how to indicate DMRS resources.

According to an embodiment of the disclosure, the DMRS resources for the DFT-S-OFDM waveform may be indicated via the combination of a group of frequency domain resources and at least one code domain resource, for example, the second case of configuration 1 is used. The priority order of the combination is CS>comb>TD-OCC, and CS can be selected from CS 0 and CS 6, comb can be selected from 0 and 1, and TD-OCC can be selected from TD-OCC (+1, +1) and TD-OCC (+1, −1). Based on that, the first DMRS resource may be indicated as: comb 0\CS 0\TD-OCC (+1, +1) and is indexed as "0"; the second DMRS resource may be indicated as: comb 0\CS 6\TD-OCC (+1, +1) and may be indexed as "1"; the third DMRS resource may be indicated as: comb 1\CS 0\TD-OCC (+1, +1) and may be indexed as "2"; the fourth DMRS resource may be indicated as: comb 1\CS 6\TD-OCC (+1, +1) and may be indexed as "2" and so on. Each indication of DMRS resource is arranged together in table 1. At the same time, for the DFT-S-OFDM waveform, a single UE only supports one transmission layer. For example, when the DFT-S-OFDM waveform is used as UL waveform, the DMRS resources may be designed to support at most 8 UEs simultaneously as shown in table 1.

TABLE 1 a DMRS mapping table for UL DFT-S-OFDM

| Resource index | comb | CS | TD-OCC |
|---|---|---|---|
| 0 | 0 | 0 | +1, +1 |
| 1 | 0 | 6 | +1, +1 |
| 2 | 1 | 0 | +1, +1 |
| 3 | 1 | 6 | +1, +1 |
| 4 | 0 | 0 | +1, −1 |
| 5 | 0 | 6 | +1, −1 |
| 6 | 1 | 0 | +1, −1 |
| 7 | 1 | 6 | +1, −1 |

With this table, a base station 10, for example a gNB can determine a DMRS resource to an antenna port and indicates it to an UE. The gNB itself is responsible for guaranteeing determined DMRS resources being orthogonal for multiple UEs. All rows or a subset of rows, i.e., a sub-table of table 1 can be predefined in specification. When all the rows of table 1 are supported, 3 bits may be used for indication. To reduce signaling overhead, only a subset of the rows may be used when UEs less than 8 will be supported. For example, when only 4 UEs will be supported in MU-MIMO (multiple user-multiple-input multiple-output), only DMRS resources 0-3 in table 1 are needed for DFT-S-OFDM. That is, the DMRS resources can be indicated only with CS and comb.

Different from the DFT-S-OFDM waveform, a single UE can support 8 layers in the CP-OFDM waveform. Meanwhile, multiple UEs to construct 8 ports DIVERS transmission are also supported in the CP-OFDM waveform. That is, for the CP-OFDM waveform, the indication of DMRS resources should consider both SU (single user) MIMO and MU-MIMO. According to embodiments of the disclosure, the DMRS resources are specified to support any transmission layers (layers) with small signaling overhead for SU-MIMO, and to be flexible for any UE for MU-MIMO.

Similarly, to generate the indications of DMRS resources for CP-OFDM waveform, a method of generating the indication of DMRS resources mainly includes determining the priority order of domain resources. The priority order also means that for a single user supporting multiple layers, the multiple layers will use the DMRS resources in sequence. In the other word, the priority order also indicates the sequence in which the transmission layers supported by a single UE use the DMRS resources. According to an embodiment of the disclosure, the domain resource may use the second case of configuration 1, that is, CS, comb and TD-OCC. There will be 6 possibilities of the order as follows:

Order 1: CS→comb→TD-OCC;
Order 2: CS→TD-OCC→comb;
Order 3: comb→CS-TD-OCC;
Order 4: comb→TD-OCC→CS;
Order 5: TD-OCC→CS→comb; and
Order 6: TD-OCC→comb-CS.

For example, with Order 1, each layer supported by a single user can use the DMRS resources in the following sequence:

Layer 0 use CS0, comb0, TD-OCC(+1,+1)
Layer 1 use CS6, comb0, TD-OCC(+1,+1)
Layer 2 use CS0, comb1, TD-OCC(+1,+1)
Layer 3 use CS6, comb1, TD-OCC(+1,+1)
Layer 4 use CS0, comb0, TD-OCC(+1,−1)
Layer 5 use CS6, comb0, TD-OCC(+1,−1)
Layer 6 use CS0, comb1, TD-OCC(+1,−1)
Layer 7 use CS6, comb1, TD-OCC(+1,−1)

Thus, the DMRS resources for a single UE with 8 layers can be indicated based on the priority order of combining the domain resources. According to an embodiment of the disclosure. 3 bits may be used to indicate the priority order. The 3 bits can be carried by RRC signaling. The 3 bits can also be included in the DCI to schedule the DMRS transmission.

According to another embodiment of the disclosure, the indications of DMRS resources for a single UE support 1 layer, 2 layers, and 4 layers can be respectively generated by selecting corresponding layers based on the above DMRS resources for a single UE with 8 layers. For example, for a single UE with 1-layer, the DMRs resources are that of layer 1 to layer 7 for the single UE with 8-layer, for a single UE with 2 layers, the DMRS resources are that of layer 2-3, layer 4-5, layer 6-7 for the single UE with 8 layers, and for a single UE with 4 layers, the DMRS resources are that of layer 4-7 for the single UE with 8 layers. Based on Order 1, a table illustrating DMRS resources covering the cases including a single UE with 1-layer, a single UE with 2 layers, a single UE with 4 layers and a single UE with 8 layer, i.e., table 2 is as follows, wherein v is the layer index and respective table for each case is a sub-table of table 2. Please note that Table 2 is shown in table 2-1 and table 2-2 to clearly show each element in the table.

According to other embodiment of the disclosure, other cases for a single UE with layers in addition to 1, 2, 4 and 8 can also be supported by adding additional rows to the table. 4 bits are may be used to indicate the detailed DMRS resource listed in the table. When the transmission layer can be informed from other scheduling information, such as precoding indication, the signaling overhead can be further reduced. For example, the precoding, indication indicates that the transmission is two-layer transmission, and the DMRS resource indication can be reduced to 2 bits. Detailed DMRS resource indication can be carried by DCI to schedule transmission. The signaling decision according an embodiment of the disclosure will consider both the overhead efficiency and common bits number to avoid UE blind detecting different DCI bits.

The corresponding table for a single UE with 8-layer in other priority orders can also be constructed in a similar way to Order 1. For example, according to an embodiment of the disclosure, for a single UE with 8 layers, table 3 of indication of DMRS resources in above 6 orders is as follows:

TABLE 2-1

8-layer DMRS mapping table in Order 1

| Index | comb v=0 | comb v=1 | comb v=2 | comb v=3 | comb v=4 | comb v=5 | comb v=6 | comb v=7 | CS v=0 | CS v=1 | CS v=2 |
|---|---|---|---|---|---|---|---|---|---|---|---|
| 0 | 0 | 0 | 1 | 1 | 0 | 0 | 1 | 1 | 0 | 6 | 0 |
| 1 | 0 | | | | | | | | 6 | | |
| 2 | 1 | | | | | | | | 0 | | |
| 3 | 1 | | | | | | | | 6 | | |
| 4 | 0 | | | | | | | | 0 | | |
| 5 | 0 | | | | | | | | 6 | | |
| 6 | 1 | | | | | | | | 0 | | |
| 7 | 1 | | | | | | | | 6 | | |
| 8 | 1 | 1 | | | | | | | 0 | 6 | |
| 9 | 0 | 0 | | | | | | | 0 | 6 | |
| 10 | 1 | 1 | | | | | | | 0 | 6 | |
| 11 | 0 | 0 | 1 | 1 | | | | | 0 | 6 | 0 |

TABLE 2-2

8-layer DMRS mapping table in Order 1

| CS v=3 | CS v=4 | CS v=5 | CS v=6 | CS v=7 | TD-OCC v=0 | TD-OCC v=1 | TD-OCC v=2 | TD-OCC v=3 | TD-OCC v=4 | TD-OCC v=5 | TD-OCC v=6 | TD-OCC v=7 |
|---|---|---|---|---|---|---|---|---|---|---|---|---|
| 6 | 0 | 6 | 0 | 6 | +1, +1 | +1, +1 | +1, +1 | +1, +1 | +1, −1 | +1, −1 | +1, −1 | +1, −1 |
| | | | | | +1, +1 | | | | | | | |
| | | | | | +1, +1 | | | | | | | |
| | | | | | +1, +1 | | | | | | | |
| | | | | | +1, +1 | | | | | | | |
| | | | | | +1, −1 | | | | | | | |
| | | | | | +1, −1 | | | | | | | |
| | | | | | +1, −1 | | | | | | | |
| | | | | | +1, −1 | | | | | | | |
| | | | | | +1, +1 | +1, +1 | | | | | | |
| | | | | | +1, −1 | +1, −1 | | | | | | |
| | | | | | +1, −1 | +1, −1 | | | | | | |
| 6 | | | | | +1, −1 | +1, −1 | +1, −1 | +1, −1 | | | | |

TABLE 3-1

8-layer DMRS mapping table for all orders

| Index | comb v = 0 | comb v = 1 | comb v = 2 | comb v = 3 | comb v = 4 | comb v = 5 | comb v = 6 | comb v = 7 | CS v = 0 | CS v = 1 | CS v = 2 |
|---|---|---|---|---|---|---|---|---|---|---|---|
| 0 | 0 | 0 | 1 | 1 | 0 | 0 | 1 | 1 | 0 | 6 | 0 |
| 1 | 0 | 1 | 0 | 1 | 0 | 1 | 0 | 1 | 0 | 0 | 6 |
| 2 | 0 | 1 | 0 | 1 | 0 | 1 | 0 | 1 | 0 | 0 | 0 |
| 3 | 0 | 0 | 0 | 0 | 1 | 1 | 1 | 1 | 0 | 0 | 0 |
| 4 | 0 | 0 | 1 | 1 | 0 | 0 | 1 | 1 | 0 | 0 | 0 |
| 5 | 0 | 0 | 0 | 0 | 1 | 1 | 1 | 1 | 0 | 0 | 6 |

TABLE 3-2

8-layer DMRS mapping table for all orders

| CS v = 3 | CS v = 4 | CS v = 5 | CS v = 6 | CS v = 7 | TD-OCC v = 0 | TD-OCC v = 1 | TD-OCC v = 2 | TD-OCC v = 3 | TD-OCC v = 4 | TD-OCC v = 5 | TD-OCC v = 6 | TD-OCC v = 7 |
|---|---|---|---|---|---|---|---|---|---|---|---|---|
| 6 | 0 | 6 | 0 | 6 | +1, +1 | +1, +1 | +1, +1 | +1, +1 | +1, −1 | +1, −1 | +1, −1 | +1, −1 |
| 6 | 0 | 0 | 6 | 6 | +1, +1 | +1, +1 | +1, +1 | +1, +1 | +1, −1 | +1, −1 | +1, −1 | +1, −1 |
| 0 | 6 | 6 | 6 | 6 | +1, +1 | +1, +1 | +1, −1 | +1, −1 | +1, +1 | +1, +1 | +1, −1 | +1, −1 |
| 6 | 0 | 6 | 0 | 6 | +1, +1 | +1, +1 | +1, −1 | +1, −1 | +1, +1 | +1, +1 | +1, −1 | +1, −1 |
| 0 | 6 | 6 | 6 | 6 | +1, +1 | +1, −1 | +1, +1 | +1, −1 | +1, +1 | +1, −1 | +1, +1 | +1, −1 |
| 6 | 0 | 0 | 6 | 6 | +1, +1 | +1, −1 | +1, +1 | +1, −1 | +1, +1 | +1, −1 | +1, +1 | +1, −1 |

Similarly, Table 3 is shown in two parts, i.e., table 3-1 and table 3-2 to clearly show each element in the table. Since there are six different mapping orders, 6 rows are shown in the 8-layer table. The DMRS table may further include at least one additional sub-table for a single UE with layer less than 8 generated by dividing at least one row from the 8-layer sub-table into a plurality of rows.

For a single UE with 4-layer, a 4-layer table 4 is constructed by divide each row of the 8-layer table into two rows according to an embodiment of the disclosure. For example, row 1 is actually layer 4-7 of row 0 in the 8-layer table 3. Table 4 is similarly shown as follows in two parts, i.e., table 4-1 and table 4-2 to clearly show each element in the table.

TABLE 4-1

4-layer DMRS mapping table for all orders

| Index for 4 layers | Index four 8 layers | comb v = 0 | comb v = 1 | comb v = 2 | comb v = 3 | comb v = 4 | comb v = 5 | comb v = 6 | comb v = 7 | CS v = 0 | CS v = 1 | CS v = 2 |
|---|---|---|---|---|---|---|---|---|---|---|---|---|
| 0 | 0 | 0 | 0 | 1 | 1 | | | | | 0 | 6 | 0 |
| 1 | | | | | | 0 | 0 | 1 | 1 | 0 | 6 | 0 |
| 2 | 1 | 0 | 1 | 0 | 1 | | | | | 0 | 0 | 6 |
| 3 | | | | | | 0 | 1 | 0 | 1 | 0 | 0 | 6 |
| 4 | 2 | 0 | 1 | 0 | 1 | | | | | 0 | 0 | 0 |
| 5 | | | | | | 0 | 1 | 0 | 1 | 6 | 6 | 6 |
| 6 | 3 | 0 | 0 | 0 | 0 | | | | | 0 | 6 | 0 |
| 7 | | | | | | 1 | 1 | 1 | 1 | 0 | 6 | 0 |
| 8 | 4 | 0 | 0 | 1 | 1 | | | | | 0 | 0 | 0 |
| 9 | | | | | | 0 | 0 | 1 | 1 | 6 | 6 | 6 |
| 10 | 5 | 0 | 0 | 0 | 0 | | | | | 0 | 0 | 6 |
| 11 | | | | | | 1 | 1 | 1 | 1 | 0 | 0 | 6 |

TABLE 4-2

4-layer DMRS mapping table for all orders

| CS v = 3 | CS v = 4 | CS v = 5 | CS v = 6 | CS v = 7 | TD-OCC v = 0 | TD-OCC v = 1 | TD-OCC v = 2 | TD-OCC v = 3 | TD-OCC v = 4 | TD-OCC v = 5 | TD-OCC v = 6 | TD-OCC v = 7 |
|---|---|---|---|---|---|---|---|---|---|---|---|---|
| 6 | | | | | +1, +1 | +1, +1 | +1, +1 | +1, +1 | | | | |
| 6 | | | | | +1, −1 | +1, −1 | +1, −1 | +1, −1 | | | | |
| 6 | | | | | +1, +1 | +1, +1 | +1, +1 | +1, +1 | | | | |
| 6 | | | | | +1, −1 | +1, −1 | +1, −1 | +1, −1 | | | | |
| 6 | | | | | +1, +1 | +1, +1 | +1, −1 | +1, −1 | | | | |
| 6 | | | | | +1, +1 | +1, −1 | +1, +1 | +1, −1 | | | | |
| 6 | | | | | +1, +1 | +1, +1 | +1, −1 | +1, −1 | | | | |
| 6 | | | | | +1, +1 | +1, −1 | +1, +1 | +1, −1 | | | | |

TABLE 4-2-continued 4-layer DMRS mapping table for all orders

| CS v = 3 | CS v = 4 | CS v = 5 | CS v = 6 | CS v = 7 | CS v = 0 | TD-OCC v = 1 | TD-OCC v = 2 | TD-OCC v = 3 | TD-OCC v = 4 | TD-OCC v = 5 | TD-OCC v = 6 | TD-OCC v = 7 |
|---|---|---|---|---|---|---|---|---|---|---|---|---|
| 6 | | | | | | +1, +1 | +1, +1 | +1, −1 | +1, −1 | | | |
| 6 | | | | | | +1, +1 | +1, −1 | +1, +1 | +1, −1 | | | |
| 6 | | | | | | +1, +1 | +1, −1 | +1, +1 | +1, −1 | | | |
| 6 | | | | | | +1, +1 | +1, −1 | +1, +1 | +1, −1 | | | |
| 6 | | | | | | +1, +1 | +1, −1 | +1, +1 | +1, −1 | | | |

Compared with 8-layer table 3, rows 1, 3, 5, 7, 9, and 11 are new additional rows, while the other rows, i.e., 0, 2, 4, 6, 8 and 10 can be covered by 8-layer table 3.

For a single UE with 2 layers, a 2-layer table 5 is constructed by dividing 3 rows of the 8-layer table into 12 rows according to an embodiment of the disclosure, wherein any one of 3 rows will be divided into 4 rows. For example, row 1 is actually layer 2-3 of row 0 in the 8-layer table, row 2 is actually layer 4-5 in the 8-layer table, and row 3 is actually layer 6-7 in the 8-layer table. The chosen 3 rows of the 8-layer table are row 0, 1 and 4. The illustrated embodiment chooses 3 rows from 6 rows to avoid duplication. Table 5 is similarly shown as follows in two parts, i.e., table 5-1 and table 5-2 to clearly show each element in the table.

TABLE 5-1

2-layer DMRS mapping table for all orders

| Index for 2 layers | Index four 8 layers | comb v = 0 | comb v = 1 | comb v = 2 | comb v = 3 | comb v = 4 | comb v = 5 | comb v = 6 | comb v = 7 | CS v = 0 | CS v = 1 | CS v = 2 |
|---|---|---|---|---|---|---|---|---|---|---|---|---|
| 0 | 0 | 0 | 0 | | | | | | | | 0 | 6 |
| 1 | | 1 | 1 | | | | | | | | 0 | 6 |
| 2 | | 0 | 0 | | | | | | | | 0 | 6 |
| 3 | | 1 | 1 | | | | | | | | 0 | 6 |
| 4 | 1 | 0 | 1 | | | | | | | | 0 | 6 |
| 5 | | 0 | 1 | | | | | | | | 6 | 6 |
| 6 | | 0 | 1 | | | | | | | | 0 | 0 |
| 7 | | 0 | 1 | | | | | | | | 6 | 6 |
| 8 | 4 | 0 | 0 | | | | | | | | 0 | 0 |
| 9 | | 1 | 1 | | | | | | | | 0 | 0 |
| 10 | | 0 | 0 | | | | | | | | 6 | 6 |
| 11 | | 1 | 1 | | | | | | | | 6 | 6 |

TABLE 5-2

2-layer DMRS mapping table for all orders

| CS v = 3 | CS v = 4 | CS v = 5 | CS v = 6 | CS v = 7 | TD-OCC v = 0 | TD-OCC v = 1 | TD-OCC v = 2 | TD-OCC v = 3 | TD-OCC v = 4 | TD-OCC v = 5 | TD-OCC v = 6 | TD OCC v = 7 |
|---|---|---|---|---|---|---|---|---|---|---|---|---|
| | | | | | +1, +1 | +1, +1 | | | | | | |
| | | | | | +1, +1 | +1, +1 | | | | | | |
| | | | | | +1, −1 | +1, −1 | | | | | | |
| | | | | | +1, −1 | +1, −1 | | | | | | |
| | | | | | +1, +1 | +1, +1 | | | | | | |
| | | | | | +1, +1 | +1, +1 | | | | | | |
| | | | | | +1, −1 | +1, −1 | | | | | | |
| | | | | | +1, −1 | +1, −1 | | | | | | |
| | | | | | +1, +1 | +1, −1 | | | | | | |
| | | | | | +1, +1 | +1, −1 | | | | | | |
| | | | | | +1, +1 | +1, −1 | | | | | | |
| | | | | | +1, +1 | +1, −1 | | | | | | |

Compared with tile 8 layer table 3, rows 3, 7 and 11 in table 5 are new additional rows, while the other rows can be covered by 8-layer table 3.

For a single UE with one layer, a 1-layer table 6 is constructed by dividing one row of the 8-layer table into 8 rows according to an embodiment of the disclosure. The illustrated embodiment chooses 1 row from 6 rows is to avoid duplication. Table 5 is similarly shown as follows in two parts, i.e., table 6-1 and table 6-2 to clearly show each element in the table.

so on in addition, compared with 8-layer table 3, row 7 in table 6 is the new additional row, while the other rows can be covered by 8-layer table 3.

All the above tables 3-6 can be used as sub-tables and are combined into one table for all priority and layers according to an embodiment of the disclosure. Table 7 generated by combining tables 3-6 together is similarly shown as follows in two parts, i.e., table 6-1 and table 6-2 to clearly show each element in the table. As shown in table 7, all new additional

TABLE 6-1

1-layer DMRS mapping table for all orders

| Index for 1 layers | Index four 8 layers | comb $v = 0$ | comb $v = 1$ | comb $v = 2$ | comb $v = 3$ | comb $v = 4$ | comb $v = 5$ | comb $v = 6$ | comb $v = 7$ | CS $v = 0$ | CS $v = 1$ | CS $v = 2$ |
|---|---|---|---|---|---|---|---|---|---|---|---|---|
| 0 | 0 | 0 |  |  |  |  |  |  |  | 0 |  |  |
| 1 |   | 0 |  |  |  |  |  |  |  | 6 |  |  |
| 2 |   | 1 |  |  |  |  |  |  |  | 0 |  |  |
| 3 |   | 1 |  |  |  |  |  |  |  | 6 |  |  |
| 4 |   | 0 |  |  |  |  |  |  |  | 6 |  |  |
| 5 |   | 0 |  |  |  |  |  |  |  | 6 |  |  |
| 6 |   | 1 |  |  |  |  |  |  |  | 0 |  |  |
| 7 |   | 1 |  |  |  |  |  |  |  | 6 |  |  |

TABLE 6-2

1-layer DMRS mapping table for all orders

| CS $v = 3$ | CS $v = 4$ | CS $v = 5$ | CS $v = 6$ | CS $v = 7$ | TD-OCC $v = 0$ | TD-OCC $v = 1$ | TD-OCC $v = 2$ | TD-OCC $v = 3$ | TD-OCC $v = 4$ | TD-OCC $v = 5$ | TD-OCC $v = 6$ | TD-OCC $v = 7$ |
|---|---|---|---|---|---|---|---|---|---|---|---|---|
|  |  |  |  |  | +1, +1 |  |  |  |  |  |  |  |
|  |  |  |  |  | +1, +1 |  |  |  |  |  |  |  |
|  |  |  |  |  | +1, +1 |  |  |  |  |  |  |  |
|  |  |  |  |  | +1, +1 |  |  |  |  |  |  |  |
|  |  |  |  |  | +1, −1 |  |  |  |  |  |  |  |
|  |  |  |  |  | +1, −1 |  |  |  |  |  |  |  |
|  |  |  |  |  | +1, −1 |  |  |  |  |  |  |  |
|  |  |  |  |  | +1, −1 |  |  |  |  |  |  |  |

As shown in table 6, row 1 is actually layer 2 of row 0 in 8-layer table 3, and row 2 is layer 3 in the 8-layer table 3 and rows for 4-layer, 2-layer and 1-layer are combined into 8-layer table 3.

TABLE 7-1 a combined DMRS mapping table for all orders and all layers

| Index | comb $v = 0$ | comb $v = 1$ | comb $v = 2$ | comb $v = 3$ | comb $v = 4$ | comb $v = 5$ | comb $v = 6$ | comb $v = 7$ | CS $v = 0$ | CS $v = 1$ | CS $v = 2$ |
|---|---|---|---|---|---|---|---|---|---|---|---|
| 0 | 0 | 0 | 1 | 1 | 0 | 0 | 1 | 1 | 0 | 6 | 0 |
| 1 | 0 | 1 | 0 | 1 | 0 | 1 | 0 | 1 | 6 | 0 | 6 |
| 2 | 0 | 1 | 0 | 1 | 0 | 1 | 0 | 1 | 6 | 0 | 6 |
| 3 | 0 | 0 | 0 | 0 | 1 | 1 | 1 | 1 | 0 | 6 | 0 |
| 4 | 0 | 0 | 1 | 1 | 0 | 0 | 1 | 1 | 0 | 0 | 6 |
| 5 | 0 | 0 | 0 | 0 | 1 | 1 | 1 | 1 | 0 | 0 | 6 |
| 6 | 0 | 0 | 1 | 1 |  |  |  |  | 0 | 6 | 0 |
| 7 | 0 | 1 | 0 | 1 |  |  |  |  | 0 | 0 | 6 |
| 8 | 0 | 1 | 0 | 1 |  |  |  |  | 6 | 6 | 6 |
| 9 | 1 | 1 | 1 | 1 |  |  |  |  | 0 | 6 | 0 |
| 10 | 0 | 0 | 1 | 1 |  |  |  |  | 6 | 6 | 6 |
| 11 | 1 | 1 | 1 | 1 |  |  |  |  | 0 | 0 | 6 |
| 12 | 1 | 1 |  |  |  |  |  |  | 0 | 6 |  |
| 13 | 0 | 1 |  |  |  |  |  |  | 6 | 6 |  |
| 14 | 1 | 1 |  |  |  |  |  |  | 6 | 6 |  |
| 15 | 1 |   |  |  |  |  |  |  | 6 |  |  |

TABLE 7-1 a combined DMRS mapping table for all orders and all layers

| CS v = 3 | CS v = 4 | CS v = 5 | CS v = 6 | CS v = 7 | TD-OCC v = 0 | TD-OCC v = 1 | TD-OCC v = 2 | TD-OCC v = 3 | TD-OCC v = 4 | TD-OCC v = 5 | TD-OCC v = 6 | TD-OCC v = 7 |
|---|---|---|---|---|---|---|---|---|---|---|---|---|
| 6 | 0 | 6 | 0 | 6 | +1, +1 | +1, +1 | +1, +1 | +1, +1 | +1, −1 | +1, −1 | +1, −1 | +1, −1 |
| 6 | 0 | 0 | 6 | 6 | +1, +1 | +1, +1 | +1, +1 | +1, +1 | +1, −1 | +1, −1 | +1, −1 | +1, −1 |
| 0 | 6 | 6 | 6 | 6 | +1, +1 | +1, +1 | +1, −1 | +1, −1 | +1, +1 | +1, +1 | +1, −1 | +1, −1 |
| 6 | 0 | 6 | 0 | 6 | +1, +1 | +1, +1 | +1, −1 | +1, −1 | +1, +1 | +1, +1 | +1, −1 | +1, −1 |
| 0 | 6 | 6 | 6 | 6 | +1, +1 | +1, −1 | +1, +1 | +1, −1 | +1, +1 | +1, −1 | +1, +1 | +1, −1 |
| 6 | 0 | 0 | 6 | 6 | +1, +1 | +1, −1 | +1, +1 | +1, −1 | +1, +1 | +1, −1 | +1, +1 | +1, −1 |
| 6 | | | | | +1, −1 | +1, −1 | +1, −1 | +1, −1 | | | | |
| 6 | | | | | +1, −1 | +1, −1 | +1, −1 | +1, −1 | | | | |
| 6 | | | | | +1, +1 | +1, +1 | +1, −1 | +1, −1 | | | | |
| 6 | | | | | +1, +1 | +1, +1 | +1, −1 | +1, −1 | | | | |
| 6 | | | | | +1, +1 | +1, −1 | +1, +1 | +1, −1 | | | | |
| 6 | | | | | +1, +1 | +1, −1 | +1, +1 | +1, −1 | | | | |
| | | | | | +1, −1 | +1, −1 | | | | | | |
| | | | | | +1, −1 | +1, −1 | | | | | | |
| | | | | | +1, +1 | +1, −1 | | | | | | |
| | | | | | +1, −1 | | | | | | | |

With combined table 7, 4 bits can be used to indicate the DMRS resource for different transmission layers, where v is the layer index. According to an embodiment of the disclosure, 4 bits for indicating the DMRS resource can be carried by DCI scheduling the corresponding transmission. Combined table 7 can support both SU-MIMO and MU-MIMO. By using different comb and/or TD-OCC resources, MU-MIMO between UEs with different scheduling bandwidth and different waveforms can also be supported.

Although only embodiments about how to generate DMRS mapping table with 1-layer, 2-layer. 4-layer and 8-layer are illustrated, tables corresponding to other transmission layers can also be constructed in a similar, and can be added to the combined table.

In addition, although the domain resources CS, comb and TD-OCC are only provided with 2 values respectively for illustrating the disclosure. More than two values for the domain resource and other domain resources, such as frequency shift and FD-OCC can also be used to generate the indication of DMRS resources, and can be used to construct layer specific table and combined table in a similar way.

Embodiments of the disclosure can also be used for additional DMRS. Regardless of the DFT-S-OFDM or CP-OFDM waveform, when an additional DMRS is configured, it means that the channel is varying quickly in time domain or an UE is quickly moving. According to one embodiment of the disclosure, in this case, the transmission layers will be restricted to a small value, and TD-OCC will not be used considering channel characteristics changes between adjacent symbols. For example, the first case of configuration 1, i.e., CS and comb, or the first case of configuration 2, i.e., frequency domain shift and FD-OCC can be used to generate the indication of DMRS resources. As a result, the size of the DMRS mapping table can also be reduced.

According to an embodiment of the disclosure, the indication of a DMRS resource in the priority order of comb>CS, and the generated DMRS mapping table is shown in the following table 8 when additional DMRS is configured:

TABLE 8

DMRS mapping table in the priority order of comb > CS with additional DMRS

| Index | comb v = 0 | comb v = 1 | comb v = 2 | comb v = 3 | CS v = 0 | CS v = 1 | CS v = 2 | CS v = 3 |
|---|---|---|---|---|---|---|---|---|
| 0 | 0 | 1 | 0 | 1 | 0 | 0 | 6 | 6 |
| 1 | 1 | | | | 0 | | | |
| 2 | 0 | | | | 6 | | | |
| 3 | 1 | | | | 6 | | | |
| 4 | 0 | 1 | | | 6 | 6 | | |

According to another embodiment of the disclosure, the indication of a DMRS resource in the priority order of CS>comb, and the generated DMRS mapping table is shown in the following table 9 when additional DMRS is configured:

TABLE 9

DMRS mapping table in the priority order of CS > comb with additional DMRS

| Index | comb v = 0 | comb v = 1 | comb v = 2 | comb v = 3 | CS v = 0 | CS v = 1 | CS v = 2 | CS v = 3 |
|---|---|---|---|---|---|---|---|---|
| 0 | 0 | 0 | 1 | 1 | 0 | 6 | 0 | 6 |
| 1 | 1 | | | | 0 | | | |
| 2 | 0 | | | | 6 | | | |
| 3 | 1 | | | | 6 | | | |
| 4 | 1 | 1 | | | 0 | 6 | | |

According to an embodiment of the disclosure, RRC or DCI signaling can be used to indicate the UE which DMRS mapping table is adopted when additional DMRS is configured. An additional DCI signaling can also be used to indicate the DMRS resource for additional DMRS for each layer. Tables 8 and 9 can also be combined into one table, which covers the two priority orders of combining comb and CS.

The DMRS resources indication when additional DMRS is configured can also be based on combined DMRS mapping table 7 with restrictions on the available rows. For example, only the rows with TD-OCC sequence (+1,+1) can be used for additional DMRS, and the rows with TD-OCC sequence (+1, −1) can NOT be used for additional DMRS.

Similarly, although domain resources CS and comb are used to illustrate embodiment of the disclosure about generating the indication of DMRS resources when additional DMRS is configured, other domain resources, such as frequency domain shift and ED-OCC can also be used to generate indications of DMRS resource and construct the DMRS mapping table when additional DMRS is configured in similar way. The difference may be considered is that 3, rather than 2 frequency domain shift can be arranged, which will affect the number of rows in the table. However, the same principle based on configuration 1 can be adopted to configuration 2 and other domain resources as shown in FIG. 3 and illustrated in the above embodiments.

According to an embodiment of the disclosure, for DL, the DMRS mapping table further comprises information mapping a DMRS port to a DMRS resource in a mapping order of the plurality of domain resources. The DMRS port to orthogonal DMRS resource mapping can be predefined in specification or configured by RRC signaling. The mapping is highly related to the mapping order of domain resources, such as CS>comb>TD-OCC. For example, when the domain resources are CS, comb and TD-OCC, there are 6 different mapping orders. As a result, there are six different kinds of port-resource mappings.

According to an embodiment, when the mapping order is CS>comb>TD-OCC, the port to resource mapping is shown in following table 10:

TABLE 10

Port to resource mapping for CS/comb/TD-OCC

| Port index | comb | CS | TD-OCC |
|---|---|---|---|
| 0 | 0 | 0 | +1, +1 |
| 1 | 0 | 6 | +1, +1 |
| 2 | 1 | 0 | +1, +1 |
| 3 | 1 | 6 | +1, +1 |
| 4 | 0 | 0 | +1, −1 |
| 5 | 0 | 6 | +1, −1 |
| 6 | 1 | 0 | +1, −1 |
| 7 | 1 | 6 | +1, −1 |

For other port-resource mapping orders, similar table as Table 10 can also be constructed.

With the port to resource mapping, a base station 10, for example a gNB can indicate the DMRS ports and transmission layers to a LT at the same time. An example table 11 for indicating DMRS ports and transmission layer is shown as follows, which is based on table 10 for port to resource mapping.

TABLE 11

DMRS ports and transmission layer indication for CS/comb/TD-OCC

| Index | DMRS port(s) |
|---|---|
| 0 | Port 0 |
| 1 | Port 0-1 |
| 2 | Port 0-2 |
| 3 | Port 0-3 |
| 4 | Port 0-4 |
| 5 | Port 0-5 |
| 6 | Port 0-6 |
| 7 | Port 0-7 |
| 8 | Port 1 |
| 9 | Port 2 |
| 10 | Port 3 |
| 11 | Port 4 |
| 12 | Port 5 |
| 13 | Port 6 |
| 14 | Port 7 |

TABLE 11-continued

DMRS ports and transmission layer indication for CS/comb/TD-OCC

| Index | DMRS port(s) |
|---|---|
| 15 | Port 2-3 |
| 16 | Port 4-5 |
| 17 | Port 6-7 |
| 18 | Port 4-7 |

With table 11 for SU-MIMO, a single UE with 8-layer can be supported. When each of MU UEs supports 1-lager transmission, at most 8 UEs can be supported simultaneously. When each of the 4 UEs supports 2-layer transmission, the total layers are 8. When each of the 4 UEs supports 4-layer transmission, at most two UEs can be paired together for MU-MIMO transmission.

Persons skilled in the art should understand that table 11 is just an example for illustrating the disclosure. More rows can be added to the table to increase scheduling flexibility, and some of the rows can be deleted to decrease signaling overhead.

In additional, although the examples about DMRS ports are shown for DL, for UL, it is also desirable to indicate the DMRS port and transmission layers together according to an embodiment of the disclosure. That is, similar table to tables 10 and 11 can also be used for UL According to an embodiment of the disclosure, the mapping order for port to resource mapping can also be predefined in specification or configured by RRC signaling. According to another embodiment of the disclosure, the DIVERS port and transmission layer indication can be carried by DCI to schedule the transmission.

Similarly. DMRS ports can also be indicated by other domain resource in a mapping order, such as frequency domain shift. FD-OCC and TD-OCC. An additional example for port to domain resource mapping f©r frequency, FD-OCC and TD-OCC is shown in table 12.

TABLE 12

Port to resource mapping for FDM/FD-OCC/TD-OCC

| Port index | FDM | FD OCC | TD OCC |
|---|---|---|---|
| 0 | 0 | +1, +1 | +1, +1 |
| 1 | 0 | +1, 1 | +1, +1 |
| 2 | 1 | +1, +1 | +1, +1 |
| 3 | 1 | +1, 1 | +1, +1 |
| 4 | 2 | +1, +1 | +1, +1 |
| 5 | 2 | +1, 1 | +1, +1 |
| 6 | 0 | +1, +1 | +1, 1 |
| 7 | 0 | +1, 1 | +1, 1 |
| 8 | 1 | +1, +1 | +1, 1 |
| 9 | 1 | +1, 1 | +1, 1 |
| 10 | 2 | +1, +1 | +1, 1 |
| 11 | 2 | +1, 1 | +1, 1 |

Based on the port to resource mapping in table 12, the DMRS port and transmission layer can be constructed in table 13 as follows.

TABLE 13

DMRS ports and layer indication for frequency domain shift/FD-OCC/TD-OCC

| Index | DMRS port(s) |
|---|---|
| 0 | Port 0 |
| 1 | Port 0-1 |

TABLE 13-continued

DMRS ports and layer indication for
frequency domain shift/FD-OCC/TD-OCC

| Index | DMRS port(s) |
|---|---|
| 2 | Port 0-2 |
| 3 | Port 0-3 |
| 4 | Port 0-4 |
| 5 | Port 0-5 |
| 6 | Port 0-6 |
| 7 | Port 0-7 |
| 8 | Port 1 |
| 9 | Port 2 |
| 10 | Port 3 |
| 11 | Port 4 |
| 12 | Port 5 |
| 13 | Port 7 |
| 14 | Port 8 |
| 15 | Port 9 |
| 16 | Port 10 |
| 17 | Port 11 |
| 18 | Port 2-3 |
| 19 | Port 4-5 |
| 20 | Port 6-7 |
| 21 | Port 8-9 |
| 22 | Port 10-11 |
| 23 | Port 4-7 |
| 24 | Port 8-11 |
| 25 | Port 4-11 |

With table 13, SU-MIMO can support up to 8 layers. When each UE supports 1 layer, MU-MIMO can support up to 12 layers with 12 UEs. When each UE supports 2 layers, MU-MIMO can support up to 12 layers with 6 UEs. When each UE support 4 layers, MU-MIMO can support up to 12 layers with 3 UEs. Table 13 can also support MU-MIMO of index 3 and index 25, that is, one UE with 4 layers, and another UE with 8 layers for MU-MIMO transmission.

Persons skilled in the art should understand that table 13 is an example for illustration. Adding of rows and removing of some of rows are also possible considering the scheduling flexibility or signaling overhead.

According to an embodiment of the disclosure, for CP-OFDM waveform, both configuration 1 and configuration 2 can be used for generating, indication of DMRS resource and/or DMRS port for DL and UL, However, the size of table 11 and table 13 sizes are different. In fact, table 11 is a subset of table 13. To design a common DMRS port/transmission layer indication table, a common table like table 13 can be adopted based on both DMRS configuration 1 and confirmation 2. To save signaling overhead, separate DMRs port/transmission layer indication tables can also be provided as table 13, and the chosen of specific DMRS port/transmission layer indication table can be via RRC signaling, which sill indicate which configuration is to be used.

According to another embodiment of the disclosure, the DMRS resources will be indicated to the UEs for DL and UL transmission. Since a DMRS resource may be transmitted in one or more symbols, the number of symbols for carrying the DMRS resources in time domain will be determined, for example when the UE receives a DMRS resource according to an embodiment of the disclosure. The number of symbols for carrying the same DMRS resources in time domain should be determined as the same by the base station 10 and UE 20 to ensure the DMRS transmission is correct and data transmission is successful and smooth.

Figure 4:
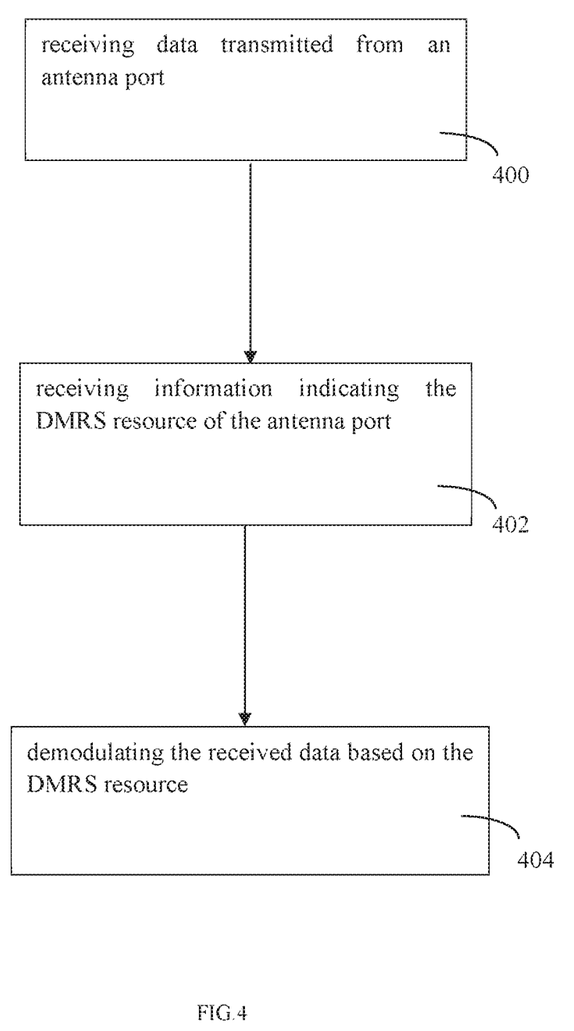
FIG. 4 illustrates a flow chart for a method of receiving DMRS resources for DL.
Figure 5:
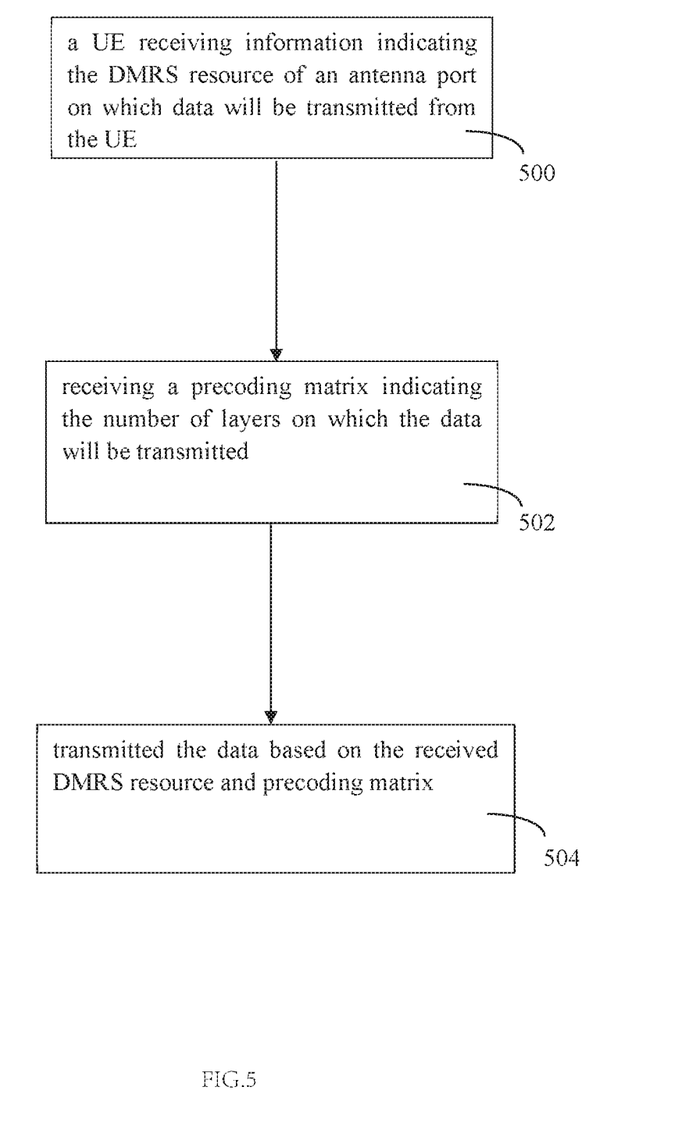
FIG. 5 illustrates a flow chart for a method of receiving DMRS resources for UL.

FIGS. 4 and 5 are respectively a flow chart for illustrating a method of receiving DMRS resources for DL and UL.

Generally, according to an embodiment of the disclosure, a method for receiving DMRS resources for DL mainly includes: receiving information indicating the DMRS resource of the antenna port; and receiving DMRS for each of the antenna port based on the indicated information. More specifically, as shown in FIG. 4, according to an embodiment of the disclosure, a method for receiving DMRS resources for DL includes: in step 400, receiving data transmitted from an antenna port. More than one antenna port may be assigned to one UE 20 by a base station 10. In step 402, information indicating the DMRS resource of the antenna port will be received by UE 20. In step 404, the number of symbols for carrying the DMRS resource in time domain will be determined by the LIE. Then, in step 406, the UE 20 will demodulate the received data based on the DMRS resource.

While, as shown in FIG. 5, a method for receiving DMRS resources for UL is little different from that for DL according to an embodiment of the disclosure. In step 500, a UE 20 will receive information indicating the DMRS resource of an antenna port on which data will be transmitted from the LIE. The antenna port may be assigned to the LIE by the base station 10. In step 402, the UE will determine the number of symbols for carrying the DMRS resource in time domain. In step 404, the UE 20 receives a precoding matrix indicating the number of layers on which the data will be transmitted. Then, step 404, when the UE 20 transmits the data, it will perform the transmission based on the received DMRS resource and precoding matrix.

According to an embodiment of the disclosure, when the plurality of domain resources includes a group of orthogonal covering codes (OCCs), whether all elements of the group of OCCs are identical will be determined by the base station 10 or LIE 20. When the all elements are identical, the number of symbols is 1 and when the all elements are not identical, the number of symbols is more than one. That is, for the base station 10, a DMRS resource will be transmitted to the UE 20 in one symbol; and for the UE 20, it will regard the received DMRS resource is transmitted in one symbol. For example, for configuration 2, when the domain resource TD-OOC is TD-OOC (+1, +1), the number of symbol will be determined as 1. Otherwise, when the domain resource TD-OCC is (+1, −1), the number of symbol will be determined as more than one, such as 2. According to this embodiment, at most 4 UEs can be multiplexed in a transparent way, which can achieve more accurate channel estimation without additional signaling overhead. Meanwhile, the embodiment of the disclosure can support the front-loaded DMRS resources carried in one symbol or two symbols in a flexible way.

According to an embodiment of the disclosure, whether additional DMRS is configured will be determined. When additional DMRS is configured, the based station 10 and UE 20 will determine that the number of symbols is 1. The base station 10 will repeat the symbols carrying corresponding front-loaded DMRS resource as an addition DMRS resource. By repeating the front-loaded DMRS resource, no additional signaling is needed to indicate the additional DMRS resource for the additional DMRS.

According to an embodiment of the disclosure, in the case that all elements of the group of OCCs is not identical while additional DMRS is configured, when a front-loaded DMRS resource is carried in one or more symbol, for example one symbol in time domain, and an additional DMRS resource is carried the same one or more symbol, for example one symbol in time domain, then the additional DMRS resource is a repetition of front-loaded DMRS resource. When a front-loaded DMRS resource is supposed to be carried in two symbols, while an additional DMRS resource is supposed to be carried in one symbol, the additional DMRS resource is a repetition of a one of the symbols for carrying the front-loaded DMRS resource, for example, repeating the first symbol or the second symbol.

According to embodiment of the disclosure, the number of symbols for carrying the DMRS resource may be predefined to be 1 or 2, or more. The number of symbols for carrying the DMRS resource may be indicated to the UE 20 by the base station 10 via RRC signaling or DCI. When two symbols are predefined for carrying DMRS resource (front loaded DMRS resource), 8 UEs can be multiplexed in a transparent way. More symbols are used, more accurate channel estimation will be achieved. While one symbol can reduce signaling; overheat For CP-OFDM waveform, beside the symbol in time domain, the number of subcarriers for carrying the DMRS resource in frequency domain is also determined according to an embodiment of the disclosure.

According to an embodiment of the disclosure, similarly, when domain resources used for indicating the MARS resource include at least one group of orthogonal covering codes (OCCs), whether all elements of the group of OCCs is identical will be determined. When the all elements are identical, the number of subcarriers is 1 and when the all elements are not identical, the number of subcarriers is more than one.

Embodiments of the disclosure illustrating how to determine the number of symbols for carrying a DMRS resource/port in time domain and the number of subcarriers for carrying the DMRS resource/port in frequency domain when FD-OCC TD-OCC is used is provided for example as follows.

In time domain: when OCC (+1, −1) is used for at least one of the indicated DMRS ports for a UE in time domain, then front loaded DMRS will contain two symbols. When OCC (+1,−1) is NOT used for any of the indicated DMRS ports for a UE in time domain, then front loaded DMRS will contain the first one symbol.

In frequency domain, when OCC (+1, −1) is used for at least one of the indicated DMRS ports for a UE in frequency domain, then the two adjacent subcarriers constructing a FD-OCC group will be used. When OCC (+1, −1) is NOT used for any of the indicated DMRS ports for a UE in frequency domain, then the first one or the second one of the two adjacent subcarriers constructing a FD-OCC group will be used.

According to an embodiment of the disclosure, default value in frequency domain can be predefined. For example, two adjacent subcarriers constructing a FD-OCC group will be predefined to be used for a DMRS resource no matter the DMRS port/resource indication. Whether +1 or −1 is used for a subcarrier is subject to DMRS port indication. The number of symbols for carrying the DMRS resource in time domain value will be determined based on DMRS port indication as illustrated in the above embodiments, for example, determining whether OCC (+1, −1) is used for at least one of the actual DMRS ports for a UE in time domain. When (+1, −1) is used, then front loaded DMRS will contain two symbols. Otherwise, when (+1,+1) is used, the front loaded DMRS will contain the first one symbol.

According to an embodiment of the disclosure, default value in time domain can be predefined. For example, two symbols are predefined for carrying a DIVERS resource. Whether +1 or −1 of OCC is used for a symbol is subject to DMRS port indication. In frequency domain, when OCC (+1,−1) is used for at least one of the actual DMRS ports for a UE in frequency domain, then the two adjacent subcarriers constructing a FD-OCC group will be determined. When OCC (+1, −1) is NOT used for any of the actual DMRS ports for a UE in frequency domain, then the first one of the two adjacent subcarriers constructing a FD-OCC group will be determined.

According to an embodiment of the disclosure, both the number of symbols in time domain and the number of subcarriers in frequency domain for carrying a DMRS resource/port can be predefined no matter the DMRS port/resource indication.

According to an embodiment, if additional DMRS is configured, the DMRS resource/port for the additional resource in frequency will be handled in a similar way to that in the time domain.

In UL, there may be a case that a UE with DFT-S-OFDM and a UE with CP-OFDM are multiplexed in the same time/frequency resource. In this case, for the CP-OFDM UE, configuration 1 will be used. From network side, regarding that the difference between DMRS of these two waveforms is only the sequence adopted (DFT-S-OFDM with ZC sequence and CP-OFDM with PN sequence), both Comb and TD-OCC can be used to differentiate UEs with different waveforms. On the other hand, from UE side, it only needs to map the DMRS according to the base station, for example, gNB indication, and determine the DMRS symbols in time domain in a same way for both waveforms.

The method of this disclosure can be implemented on a programmed processor, which may be coupled to a memory. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

What is claimed:

1. A method for demodulation reference signal (DMRS) transmission, the method comprising:
   determining a plurality of DMRS resources for at least one antenna port of a user equipment (UE), wherein the plurality of DMRS resources comprises a front-loaded DMRS resource and an additional DMRS resource, and the additional DMRS resource is based on the front-loaded DMRS resource;
   determining a number of symbols for carrying the front-loaded DMRS resource in a time domain; and indicating the plurality of DMRS resources for the at least one antenna port and the determined number of symbols for carrying the front-loaded DMRS resources to the UE, wherein:
- the plurality of DMRS resources are selected from a DMRS mapping table;
- the DMRS mapping table is generated by a plurality of domain resources combined in at least one priority order; and
- the at least one priority order comprises cyclic shift (CS) having first priority, comb having second priority, and time domain-orthogonal cover code (TD-OCC) having third priority, wherein the comb is a group of frequency domain resources.

2. The method of claim 1, wherein, in response to a number of the at least one priority order being more than one, the method further comprises indicating a priority order of the at least one priority order for generating the DMRS resources.

3. The method of claim 1, wherein, for a cyclic prefix-orthogonal frequency division multiplexing (CP-OFDM) waveform, the at least one priority order indicates a sequence in which transmission layers supported by a single UE uses DMRS resources.

4. The method of claim 1, wherein, for a cyclic prefix-orthogonal frequency division multiplexing (CP-OFDM) waveform, the DMRS mapping table includes an 8-layer sub-table for a single UE with 8-layers generated in one priority order of the at least one priority order.

5. The method of claim 4, wherein the DMRS mapping table further includes an additional sub-table generated in the one priority order for the single UE with a number of layers less than 8, and the additional sub-table is generated by dividing at least one row from the 8-layer sub-table into multiple rows.

6. The method of claim 2, wherein for a cyclic prefix-orthogonal frequency division multiplexing (CP-OFDM) waveform, the priority order is indicated to the UE via a radio resource control (RRC) signaling or is included in downlink control information (DCI).

7. The method of claim 1, wherein the DMRS resources are is indicated to the UE via downlink control information (DCI).

8. The method of claim 1, wherein for a cyclic prefix-orthogonal frequency division multiplexing (CP-OFDM) waveform, the DMRS mapping table includes an 8-layer sub-table for a single UE with 8-layers generated in the at least one priority order, and each row of the 8-layer sub-table corresponds to one priority order of the at least one priority order.

9. The method of claim 8, wherein the DMRS table further includes an additional sub-table for the single UE with a number of layers less than 8 generated by dividing at least one row from the 8-layer sub-table into a plurality of rows.

10. The method of claim 1, wherein, for a cyclic prefix-orthogonal frequency division multiplexing (CP-OFDM) waveform, in response to an additional DMRS being configured, the DMRS mapping table is generated by 2 domain resources combined in the at least one priority order.

11. The method of claim 1, wherein, in response to the DMRS resources being for downlink, the DMRS mapping table further comprises information mapping a DMRS port to a DMRS resource in mapping order of the plurality of domain resources.

12. The method of claim 11, wherein the DMRS port is indicated via downlink control information (DCI).

13. The method of claim 12, wherein, in response to the plurality of domain resources for indicating the DMRS resources includes a group of orthogonal covering codes (OCCs), the method further comprises determining whether all elements of the group of OCCs are identical, and, in response to all of the elements of the group of OCCs being identical, the determined number of symbols is 1 and, in response to all of the elements of the group of OCCs not being identical, the determined number of symbols is more than one.

14. The method of claim 12, wherein, in response to an additional DMRS being configured, the determined number of symbols is 1.

15. The method of claim 12, wherein, in response to an additional DMRS being configured, the method further comprises repeating one of the symbols of the number of symbols carrying the corresponding front-loaded DMRS resource.

16. The method of claim 12, wherein the determined number of symbols for carrying the DMRS resources is predefined to be 1 or more than one.

17. The method of claim 12, further comprising indicating the determined number of symbols for carrying the DMRS resources to the UE via RRC signaling or downlink control information (DCI).

18. The method of claim 1, further comprising determining a number of subcarriers for carrying the DMRS resources in a frequency domain.

19. The method of claim 17, wherein, in response to the plurality of domain resources for indicating the DMRS resources include at least one group of orthogonal covering codes (OCCs), the method further comprises determining whether all elements of the group of OCCs are identical, and, in response to all of the elements being identical, the determined number of subcarriers is 1 and, in response to all of the elements not being identical, the determined number of subcarriers is more than one.

20. An apparatus for demodulation reference signal (DMRS) transmission, the apparatus comprising:
- a memory; and
- a processor coupled to the memory and configured to:
  - determine a plurality of DMRS resources for at least one antenna port of a user equipment (UE), wherein the plurality of DMRS resources comprises a front-loaded DMRS resource and an additional DMRS resource, and the additional DMRS resource is based on the front-loaded DMRS resource;
  - determine a number of symbols for carrying the front-loaded DMRS resource in a time domain; and
  - indicate the plurality of DMRS resources for the at least one antenna port and the determined number of symbols for carrying the front-loaded DMRS resources to the UE, wherein:
    - the plurality of DMRS resources are selected from a DMRS mapping table;
    - the DMRS mapping table is generated by a plurality of domain resources combined in at least one priority order; and
    - the at least one priority order comprises cyclic shift (CS) having first priority, comb having second priority, and time domain-orthogonal cover code (TD-OCC) having third priority, wherein the comb is a group of frequency domain resources.

21. A method for demodulation reference signal (DMRS) transmission, the method comprising:
- receiving information indicating a plurality of DMRS resources for an antenna port of a user equipment (UE), wherein the plurality of DMRS resources comprise at least a front-loaded DMRS resource that is carried in a time domain in a determined number of symbols, and an additional DMRS resource, and the additional DMRS resource is based on the front-loaded DMRS resource; and
- receiving the plurality of DMRS resources for the antenna port of the UE based on the indicated information, wherein:
  - the plurality of DMRS resources are selected from a DMRS mapping table;
  - the DMRS mapping table is generated by a plurality of domain resources combined in at least one priority order; and
  - the at least one priority order comprises cyclic shift (CS) having first priority, comb having second priority, and time domain-orthogonal cover code (TD-OCC) having third priority, wherein the comb is a group of frequency domain resources.

22. An apparatus for demodulation reference signal (DMRS) transmission, the apparatus comprising:
- a memory; and
- a processor coupled to the memory and configured to:
  - receive information indicating a plurality of DMRS resources for an antenna port of a user equipment (UE), wherein the plurality of DMRS resources comprise at least a front-loaded DMRS resource that is carried in a time domain in a determined number of symbols, and an additional DMRS resource, and the additional DMRS resource is based on the front-loaded DMRS resource; and
  - receive the plurality of DMRS resources for the antenna port of the UE based on the indicated information, wherein:
    - the plurality of DMRS resources are selected from a DMRS mapping table;
    - the DMRS mapping table is generated by a plurality of domain resources combined in at least one priority order; and
    - the at least one priority order comprises cyclic shift (CS) having first priority, comb having second priority, and time domain-orthogonal cover code (TD-OCC) having third priority, wherein the comb is a group of frequency domain resources.

* * * * *